United States Patent
Ye

(10) Patent No.: US 8,100,376 B2
(45) Date of Patent: Jan. 24, 2012

(54) SUPPORTING BRACKET

(75) Inventor: Zhen-Xing Ye, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 101 days.

(21) Appl. No.: 12/647,386

(22) Filed: Dec. 24, 2009

(65) Prior Publication Data

US 2011/0101193 A1 May 5, 2011

(30) Foreign Application Priority Data

Oct. 29, 2009 (CN) .......................... 2009 1 0309070

(51) Int. Cl.
*A47G 1/24* (2006.01)

(52) U.S. Cl. ........ 248/454; 248/455; 248/459; 248/460; 40/754

(58) Field of Classification Search .................. 248/454, 248/455, 456, 457, 459, 460, 174, 921, 447; 211/43, 195; 40/124.16, 754, 755
See application file for complete search history.

(56) References Cited

U.S. PATENT DOCUMENTS

| | | | | |
|---|---|---|---|---|
| 1,053,112 A * | 2/1913 | Sott | ................................ | 248/456 |
| 2,591,170 A * | 4/1952 | Levinson et al. | ............. | 248/456 |
| 3,447,770 A * | 6/1969 | Gallamos | ...................... | 248/453 |
| 3,460,795 A * | 8/1969 | Dahlin | ......................... | 248/452 |
| 3,937,435 A * | 2/1976 | Roberts | ......................... | 248/464 |
| 4,460,146 A * | 7/1984 | Raggiotti | ....................... | 248/456 |
| 4,674,724 A * | 6/1987 | Gaudet | .......................... | 248/459 |
| 4,739,960 A * | 4/1988 | Adler | ............................ | 248/453 |
| 5,607,135 A * | 3/1997 | Yamada | ......................... | 248/456 |
| D382,300 S * | 8/1997 | Thorne et al. | .................. | D19/91 |
| 6,082,696 A * | 7/2000 | Patterson | ....................... | 248/454 |
| 6,568,543 B1 * | 5/2003 | Schneider | ....................... | 211/43 |
| 7,861,995 B2 * | 1/2011 | Liou | ............................ | 248/454 |
| 2010/0090085 A1 * | 4/2010 | Corrion | ......................... | 248/459 |
| 2010/0213331 A1 * | 8/2010 | Liou | ........................... | 248/176.3 |

* cited by examiner

*Primary Examiner* — Kimberly Wood

(74) *Attorney, Agent, or Firm* — Altis Law Group, Inc.

(57) ABSTRACT

A supporting bracket includes a fixed member having a stopping tab thereon, a moveable member pivotally connected to the fixed member, a back plate having a first end pivotally connected to the fixed member and an opposite second end, and a locking unit connected to the moveable member. A plurality of slots is defined in the second end. When the supporting bracket is applied to an object thereon, the back plate is rotated up relative to the fixed member, the moveable member is rotated up relative to the fixed member, the locking unit is inserted into a slot of the back plate, and the object is supported on the back plate in a tilted manner with a bottom of the object sandwiched between the stopping tab and the back plate.

9 Claims, 5 Drawing Sheets

SUPPORTING BRACKET

BACKGROUND

1. Technical Field

The present disclosure generally relates to supporting brackets, and more particularly to a supporting bracket for mounting a hand-held electronic device thereon so that a user can view a screen of the hand-held electronic device comfortably.

2. Description of Related Art

Many hand-held electronic devices have the function of playing video. Such hand-held electronic devices may include mobile phones, personal digital assistants (PDAs) and portable media players (PMPs). Currently, when a user playbacks a video on a hand-held electronic device, he or she generally has to hold the hand-held electronic device by hand. The user may feel tired when he or she has been holding the device for a long time. Furthermore, a viewing experience is affected if the hand suffers quiver.

For the foregoing reasons, there is a need in the art for a supporting bracket for mounting a hand-held electronic device thereon which can overcome the above described limitation.

DETAILED DESCRIPTION

Figure 1:
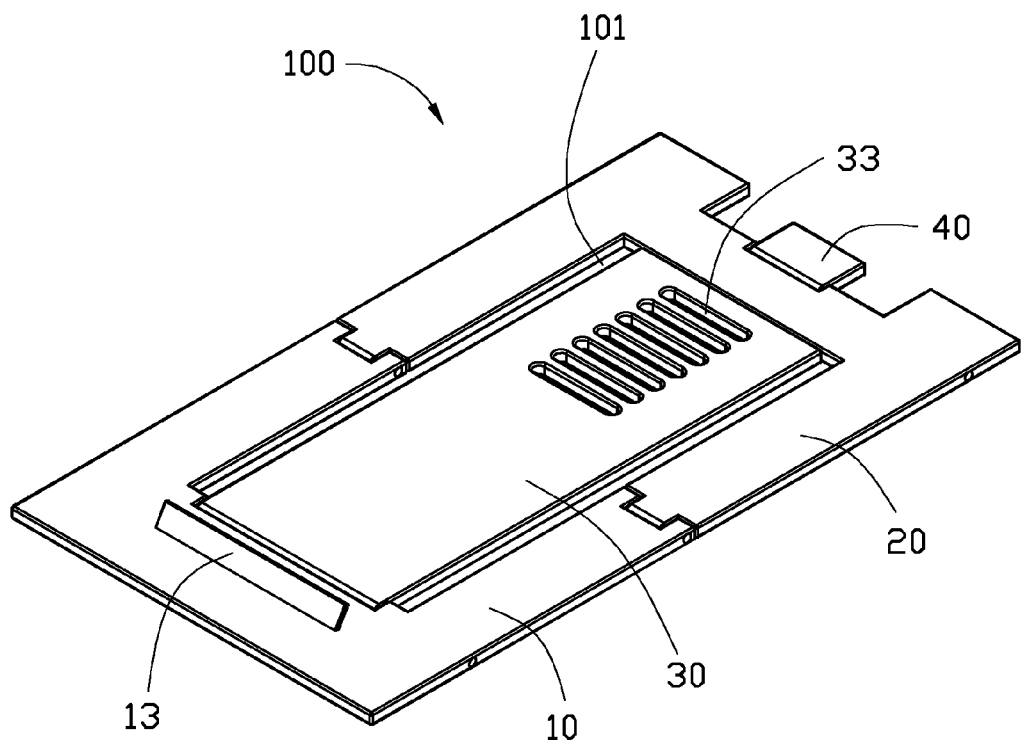
FIG. 1 is an isometric view of a supporting bracket for hand-held electronic device according to an exemplary embodiment of the present disclosure, wherein the supporting bracket is shown in a non-use state.

Reference will now be made to the drawing figures to describe the present supporting bracket in detail.

Figure 4:
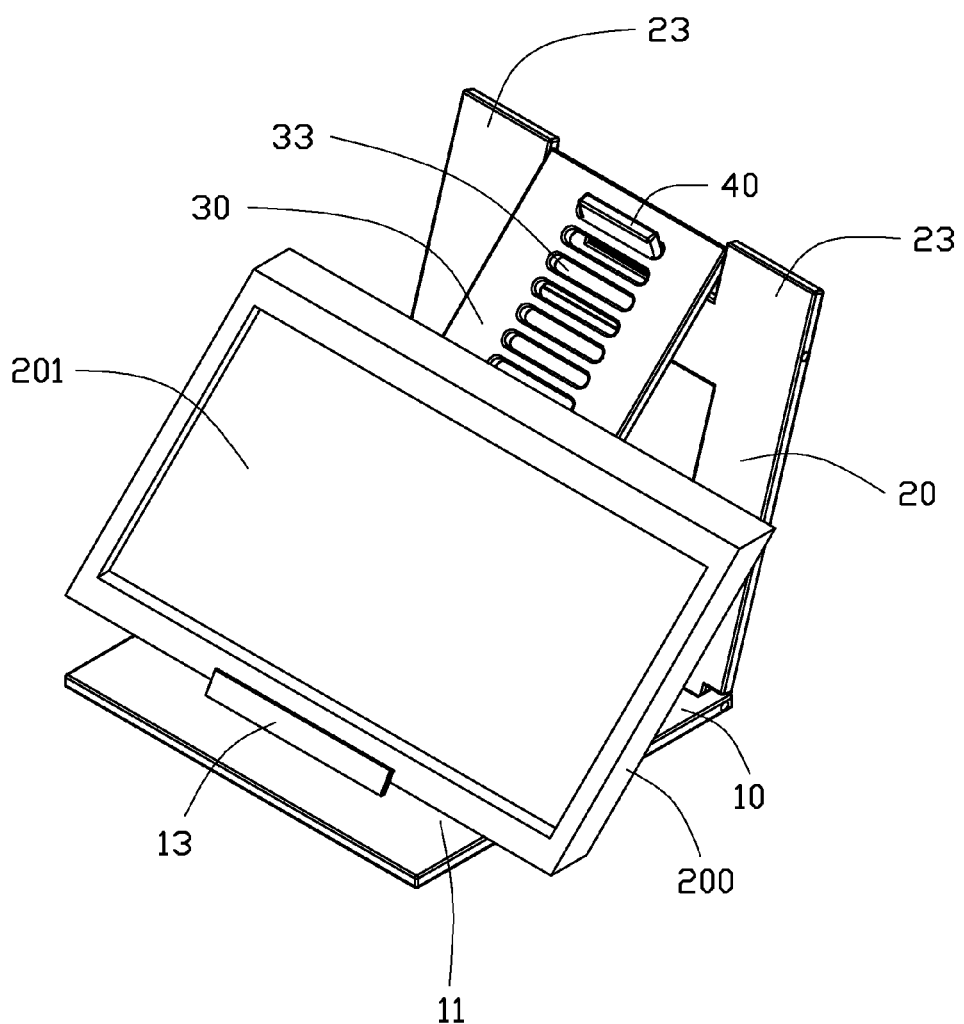
FIG. 4 is similar to FIG. 3, with a hand-held electronic device mounted on the supporting bracket.

FIGS. 1 and 4 show a supporting bracket 100 according to an exemplary embodiment of the present disclosure. The supporting bracket 100 can be used for mounting a hand-held electronic device 200 thereon so that a user can conveniently and comfortably view a video played on a screen 201 of the hand-held electronic device 200. The hand-held electronic device 200 may be a mobile phone, a personal digital assistant (PDA) or a portable media player (PMP). The supporting bracket 100 includes a fixed member 10, a moveable member 20, a back plate 30, and a locking unit 40.

Figure 2:
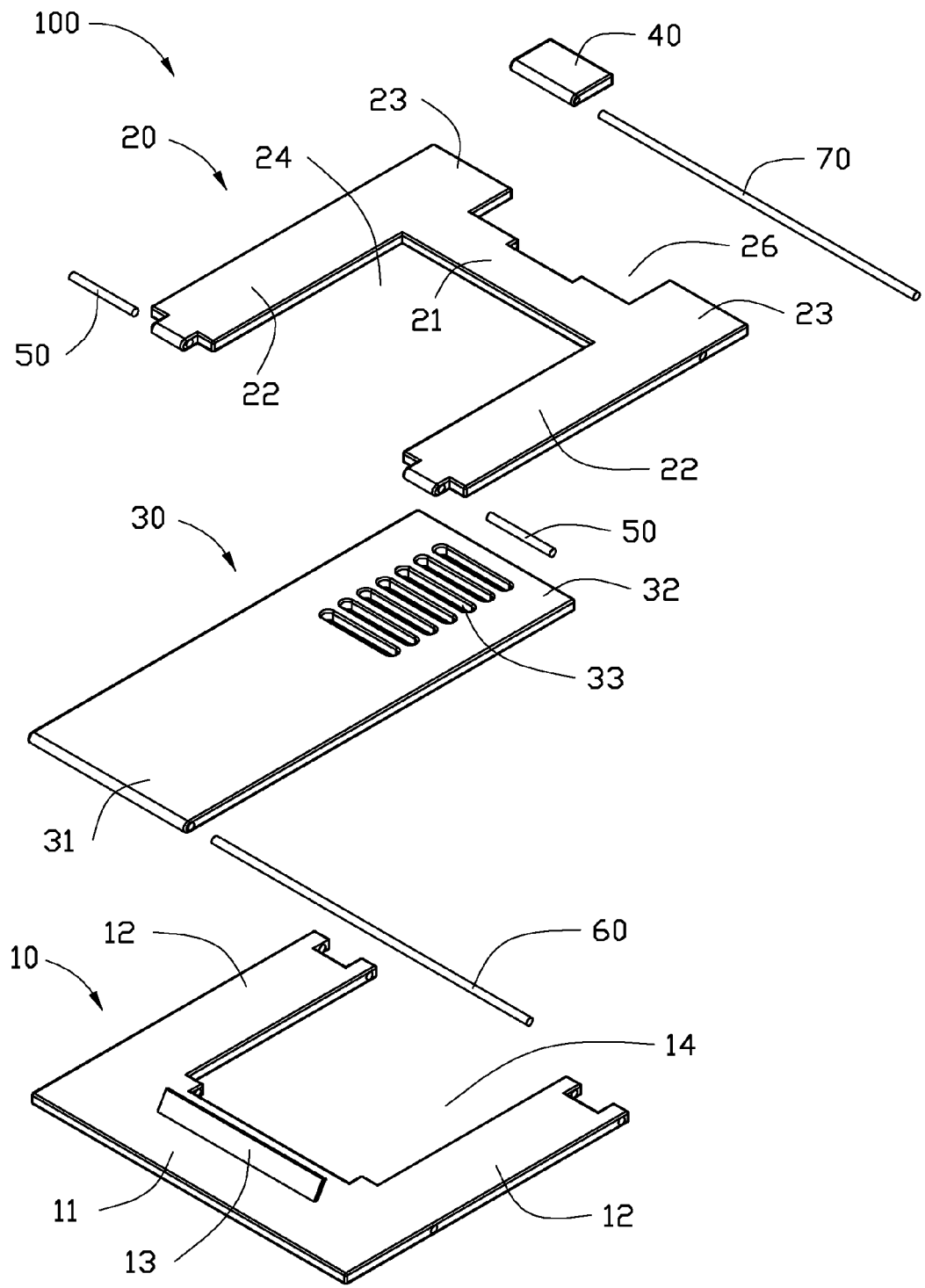
FIG. 2 is an isometric, exploded view of the supporting bracket of FIG. 1.

Referring also to FIG. 2, the fixed member 10 is flat and U-shaped, including a first plate 11 and a pair of first arms 12 extending backwards from two opposite ends of the first plate 11 towards the moveable member 20. A first groove 14 is defined among the first plate 11 and the first arms 12. A stopping tab 13 is formed on a top surface of the first plate 11 and is tilted towards the moveable member 20.

The moveable member 20 is H-shaped, including a second plate 21, a pair of second arms 22 extending frontwards from two opposite ends of the second plate 21 towards the fixed member 10, and a pair of third arms 23 extending backwards from the two opposite ends of the second plate 21. Put in another way, the second arms 22 and the third arms 23 extend from the two opposite ends of the second plate 21 in opposite directions. A second groove 24 is defined among the second plate 21 and the second arms 22. A third groove 26 is defined among the second plate 21 and the third arms 23. The second arms 22 of the moveable member 20 are pivotally connected, end to end, to the first arms 12 of the fixed member 10 via two pivots 50, such that a receiving space 101 is defined between the fixed member 10 and moveable member 20 wherein the receiving space 101 is consisted of the first groove 14 and the second groove 24. The moveable member 20 is capable of being rotated relative to the fixed member 10 around the pivots 50.

The back plate 30 is rectangular, and includes a front portion 31 and a back portion 32. The front portion 31 is received in the first groove 14 and sandwiched between the first arms 12. The front portion 31 is pivotally connected to the first plate 11 via a pivot 60, such that the back plate 30 is capable of being rotated relative to the fixed member 10 around the pivot 60. The back portion 32 is received in the second groove 24 and sandwiched between the second arms 22. A plurality of elongated slots 33 is defined in the back portion 32. The slots 33 are parallel to and spaced from each other and arranged in a line from the back portion 32 towards the front portion 31.

The locking unit 40 is a rectangular block. The locking unit 40 has a size smaller than the third groove 26 of the moveable member 20 and is received in the third groove 26. A lateral side of the locking unit 40 is pivotally connected to the second plate 21 of the moveable member 20 via a pivot 70, such that the locking unit 40 is capable of being rotated relative to the moveable member 20 around the pivot 70.

Referring to FIG. 1, in a non-use state, the moveable member 20 is coplanar with the fixed member 10, and the back plate 30 is entirely received in the receiving space 101, such that the supporting bracket 100 is flat on the whole and can be taken from a location to another location conveniently.

Figure 3:
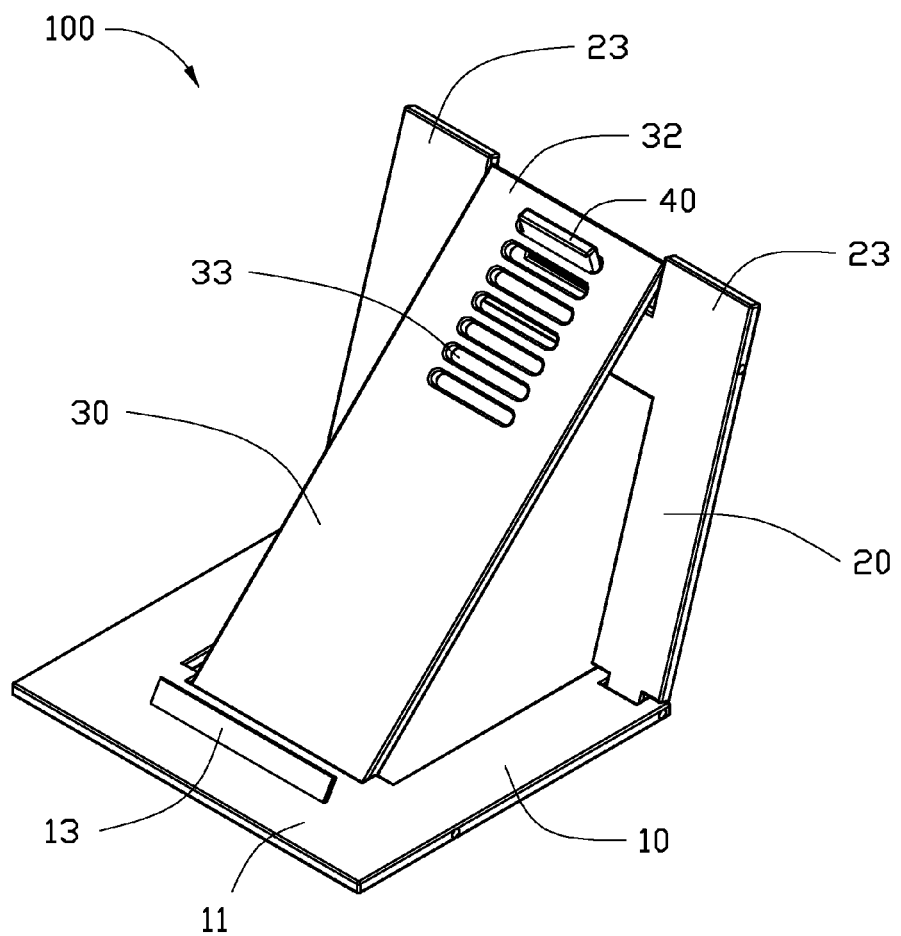
FIG. 3 is an isometric view of the supporting bracket of FIG. 1, wherein the supporting bracket is shown in a use state.

Referring to FIG. 3, in use, the back portion 32 of the back plate 30 is lifted up from the receiving space 101 and the back plate 30 is rotated relative to the fixed member 10 around the pivot 60. Then, the moveable member 20 is rotated upwardly relative to the fixed member 10 around the pivots 50. Thereafter, the locking unit 40 is adjusted to a proper position and inserted into one slot 33 of the plurality of elongated slots 33. A top end of the back portion 32 of the back plate 30 is received in the third groove 26 of the moveable member 20 and supported on the second plate 21 of the moveable member 20. The fixed member 10, the moveable member 20 and the back plate 30 cooperatively form a triangular shape.

As shown in FIG. 4, when the hand-held electronic device 200 is mounted on the supporting bracket 100, the hand-held electronic device 200 is placed on the first plate 11 of the fixed member 10 and a back of the hand-held electronic device 200 is supported on the back plate 30. A bottom of the hand-held electronic device 200 is sandwiched between the back plate 30 and the stopping tab 13 of the fixed member 10, such that the hand-held electronic device 200 can not move on the fixed member 10. In FIG. 4, the locking unit 40 is locked in an uppermost slot 33 of the plurality of elongated slots 33, and a tilted angle of the hand-held electronic device 200 is minimum, which is 40 degrees.

Figure 5:
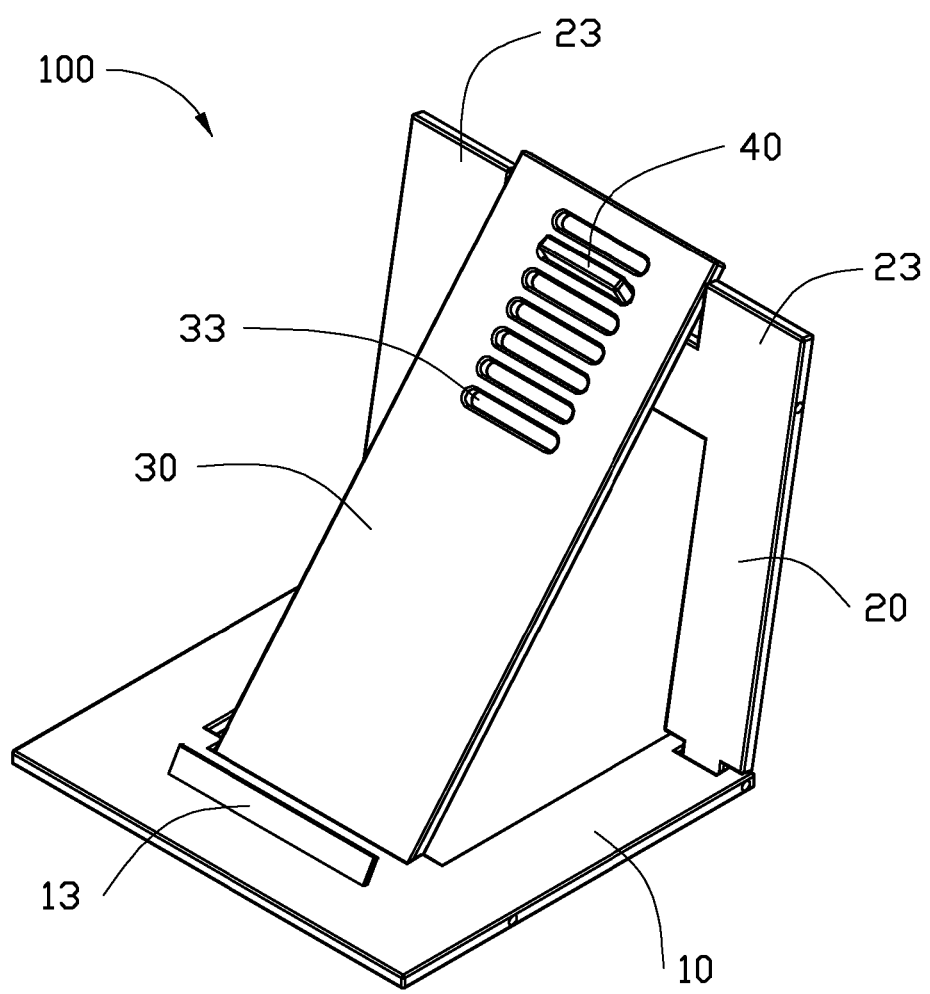
FIG. 5 is an isometric view of the supporting bracket of FIG. 1, wherein the supporting bracket is shown in another use state.

In order to obtain an optimum view experience, a user can adjust the tilted angle of the hand-held electronic device 200 according to need. For example, as shown in FIG. 5, the locking unit 40 is locked in the second slot 33 of the plurality of elongated slots 33, and a tilted angle of the hand-held electronic device 200 is increased by a little, which is 45 degrees.

It is to be understood, however, that even though numerous characteristics and advantages of embodiment have been set forth in the foregoing description, together with details of the structures and functions of the embodiment, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A supporting bracket, comprising:
    a fixed member having a stopping tab formed thereon;
    a moveable member pivotally connected to the fixed member;
    a back plate having a first end pivotally connected to the fixed member and an opposite second end, at least one slot being defined in the second end; and
    a locking unit pivotally connected to the moveable member, the locking unit rotatable relative to the moveable member;
    wherein when the supporting bracket is in a non-use state, the fixed member and the moveable member are coplanar, a receiving space is defined between the fixed member and the moveable member, and the back plate is received in the receiving space; and
    wherein when the supporting bracket is in use, the back plate is rotated up from the receiving space relative to the fixed member, the moveable member is rotated up relative to the fixed member, and the locking unit is inserted into one slot of the at least one slot, whereby an object can be supported on the back plate in a tilted manner with a bottom of the object sandwiched between the stopping tab and the back plate.

2. The supporting bracket of claim 1, wherein the fixed member is U-shaped, comprising a first plate and a pair of first arms extending from two opposite ends of the first plate towards the moveable member, a first groove is defined among the first plate and the first arms, and the first end of the back plate is received in the first groove when the supporting bracket is in the non-use state.

3. The supporting bracket of claim 2, wherein the moveable member is H-shaped, comprising a second plate, a pair of second arms extending from two opposite ends of the second plate towards the fixed member, and a pair of third arms extending from the two opposite ends of the second plate in an opposite direction to the second arms, a second groove is defined among the second plate and the second arms, a third groove is defined among the second plate and the third arms, the second end of the back plate is received in the second groove when the supporting bracket is in the non-use state, and the second end of the back plate is received in the third groove of the moveable member and supported on the second plate of the moveable member when the supporting bracket is in use.

4. The supporting bracket of claim 3, wherein the receiving space comprises the first groove and the second groove.

5. The supporting bracket of claim 3, wherein the second arms of the moveable member are pivotally connected to the fixed member at the first arms of the fixed member.

6. The supporting bracket of claim 3, wherein the locking unit is received in the third groove of the moveable member and has a size smaller than the third groove, and a lateral side of the locking unit is pivotally connected to the moveable member.

7. The supporting bracket of claim 1, wherein the at least one slot comprises a plurality of elongated slots defined in the second end of the back plate, and the slots are parallel to and spaced from each other and arranged in a line from the second end towards the first end of the back plate.

8. The supporting bracket of claim 1, wherein the fixed member, the moveable member and the back plate cooperatively form a triangular shape when the bracket is in use.

9. The supporting bracket of claim 1, wherein the stopping tab is tilted from the fixed member towards the moveable member.

* * * * *